United States Patent
Chen

(10) Patent No.: US 11,226,631 B2
(45) Date of Patent: Jan. 18, 2022

(54) SHUTTLE VEHICLE SPEED CONTROL METHOD AND APPARATUS, AND SHUTTLE VEHICLE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Xiaotao Chen, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 327 days.

(21) Appl. No.: 16/475,601

(22) PCT Filed: Dec. 27, 2017

(86) PCT No.: PCT/CN2017/119003
§ 371 (c)(1),
(2) Date: Jul. 2, 2019

(87) PCT Pub. No.: WO2018/126967
PCT Pub. Date: Jul. 12, 2018

(65) Prior Publication Data
US 2019/0324469 A1  Oct. 24, 2019

(30) Foreign Application Priority Data

Jan. 3, 2017 (CN) .................. 201710003147.X

(51) Int. Cl.
*G05D 1/02* (2020.01)
(52) U.S. Cl.
CPC ... *G05D 1/0223* (2013.01); *G05D 2201/0216* (2013.01)

(58) Field of Classification Search
CPC .................. G05D 2201/0216; G05D 1/0223
See application file for complete search history.

(56) References Cited

U.S. PATENT DOCUMENTS

| 3,934,515 A * | 1/1976 | Cushman | B66B 21/10 104/18 |
| 4,155,426 A * | 5/1979 | Booker, Jr. | B66B 1/285 187/295 |
| 2007/0075670 A1* | 4/2007 | Akiyama | G05B 19/416 318/651 |

FOREIGN PATENT DOCUMENTS

CN 101477354 A 7/2009
CN 101847003 A 9/2010
(Continued)

OTHER PUBLICATIONS

International Search Report dated Mar. 14, 2018 in PCT/CN2017/119003, 3 pages.
(Continued)

*Primary Examiner* — Calvin Cheung
(74) *Attorney, Agent, or Firm* — Oblon, McClelland, Maier & Neustadt, L.L.P.

(57) ABSTRACT

The present disclosure provides a method and an apparatus for controlling speed of a shuttle vehicle, and a shuttle vehicle, and relates to the field of control. The method includes: controlling the shuttle vehicle to perform an accelerated motion from a starting point of a specified displacement at a initial speed, wherein the accelerated motion comprises a first accelerated motion with the acceleration increasing with time is performed at first, and a second accelerated motion with the acceleration decreasing with time is performed; controlling the shuttle vehicle to perform an uniform motion; and controlling the shuttle vehicle to perform a decelerated motion, wherein the decelerated motion comprises a first decelerated motion with the accel-
(Continued)

eration decreasing with time is performed at first, and a second decelerated motion with the acceleration increasing with time is performed, and the shuttle vehicle arrives at a destination of the specified displacement at an end speed.

19 Claims, 6 Drawing Sheets

(56) References Cited

FOREIGN PATENT DOCUMENTS

| | | |
|---|---|---|
| CN | 102897460 A | 1/2013 |
| CN | 103818672 A | 5/2014 |
| CN | 104229370 A | 12/2014 |
| CN | 106115197 A | 11/2016 |
| CN | 106647749 A | 5/2017 |
| CN | 106843207 A | 6/2017 |
| KR | 10-0793486 B1 | 1/2008 |

OTHER PUBLICATIONS

Jun, W "Research on Moving Control System of Shuttle Rack" University of South China, 2012, 62 pages (with English abstract).

\* cited by examiner

SHUTTLE VEHICLE SPEED CONTROL METHOD AND APPARATUS, AND SHUTTLE VEHICLE

CROSS-REFERENCE TO RELATED APPLICATIONS

The present application is based on the application of the CN application number 201710003147.X with the application date of Jan. 3, 2017, claims the priority, and the disclosure contents of the CN application are hereby incorporated herein by reference in its entirety.

TECHNICAL FIELD

The present disclosure relates to the field of control, and in particular, to a method and an apparatus for controlling speed of a shuttle vehicle, and a shuttle vehicle.

BACKGROUND

In modern automated logistics warehouses, a linear reciprocating track shuttle vehicle (Shuttle trolley) need to move at a very high speed (up to 4 meters per second) and require accurate positioning, are mainly driven by servo amplifiers, and are positioned in cooperation of yardstick sensors.

SUMMARY

According to one aspect of this present disclosure, a method for controlling speed of a shuttle vehicle is provided. The method comprising: controlling the shuttle vehicle to perform an accelerated motion from a starting point of a specified displacement at a initial speed $V_s$, wherein the accelerated motion comprises a first accelerated motion with the acceleration increasing with time is performed at first, and a second accelerated motion with the acceleration decreasing with time is performed; controlling the shuttle vehicle to perform an uniform motion; and controlling the shuttle vehicle to perform a decelerated motion, wherein the decelerated motion comprises a first decelerated motion with the acceleration decreasing with time is performed at first, and a second decelerated motion with the acceleration increasing with time is performed, and the shuttle vehicle arrives at a destination of the specified displacement at a end speed $V_e$.

In some embodiments, a time during which the shuttle vehicle performs the first accelerated motion and a time during which the shuttle vehicle performs the second accelerated motion are a time $T_1$; and a time during which the shuttle vehicle performs the first decelerated motion and a time during which the shuttle vehicle performs the second decelerated motion are a time $T_2$.

In some embodiments, a square difference between the time $T_1$ and the time $T_2$ is direct proportional to a difference value between the end speed $V_e$ and the initial speed $V_s$ of the shuttle vehicle.

In some embodiments, the specified displacement is greater than a predetermined threshold, wherein the predetermined threshold is determined by the initial speed $V_s$ and the end speed $V_e$.

the predetermined threshold is determined by a sum of the end speed $V_e$ and the initial speed $V_s$, and a difference between the end speed $V_e$ and the initial speed $V_s$.

In some embodiments, the maximum value of the time $T_2$ is $$\sqrt{\frac{V_{max} - V_e}{J}},$$

wherein $V_{max}$ represents the maximum speed of the shuttle vehicle, and J represents an acceleration parameter; and in the case that the shuttle vehicle only performs the accelerated motion and the decelerated motion when passing by the specified displacement, a time during which the shuttle vehicle performs the uniform motion is 0, and the time $T_2$ and the time $T_1$ are determined by performing Bisection method on a displacement function of the shuttle vehicle.

In some embodiments, in the case that the end speed $V_e$ is not less than the initial speed $V_s$, the minimum value of the time $T_2$ is 0; and in the case that the end speed $V_e$ is less than the initial speed $V_s$, the minimum value of the time $T_2$ is $$\sqrt{\frac{V_s - V_e}{J}}.$$

In some embodiments, the method further comprising: determining an first displacement of the shuttle vehicle to perform the accelerated motion by using the time $T_1$ and the initial speed $V_s$; determining a second displacement of the shuttle vehicle to perform the decelerated motion by using the time $T_2$ and the end speed $V_e$; and using a difference value obtained by subtracting the first displacement and the second displacement from the specified displacement as a third displacement of the shuttle vehicle to perform the uniform motion.

In some embodiments, the method further comprising: determining a time $T_3$ during which the shuttle vehicle performs the uniform motion by using the third displacement, the time $T_1$ and the initial speed $V_s$.

In some embodiments, the method further comprising: determining a running speed of the shuttle vehicle at each moment by using the initial speed $V_s$, the acceleration parameter J, the time $T_1$, the time $T_2$, and the time $T_3$.

According to another aspect of this present disclosure, an apparatus for controlling speed of a shuttle vehicle is provided. The apparatus comprising: a memory, configured to store instructions; and a processor, coupled to the memory, and based on the instructions stored in the memory, the processor is configured to: controlling the shuttle vehicle to perform an accelerated motion from a starting point of a specified displacement at a initial speed $V_s$, wherein the accelerated motion comprises a first accelerated motion with the acceleration increasing with time is performed at first, and a second accelerated motion with the acceleration decreasing with time is performed; controlling the shuttle vehicle to perform an uniform motion; and controlling the shuttle vehicle to perform a decelerated motion, wherein the decelerated motion comprises a first decelerated motion with the acceleration decreasing with time is performed at first, and a second decelerated motion with the acceleration increasing with time is performed, and the shuttle vehicle arrives at a destination of the specified displacement at a end speed $V_e$.

In some embodiments, a time during which the shuttle vehicle performs the first accelerated motion and a time during which the shuttle vehicle performs the second accelerated motion are a time $T_1$; and a time during which the shuttle vehicle performs the first decelerated motion and a time during which the shuttle vehicle performs the second decelerated motion are a time $T_2$.

In some embodiments, a square difference between the time $T_1$ and the time $T_2$ is direct proportional to a difference value between the end speed $V_e$ and the initial speed $V_s$ of the shuttle vehicle.

In some embodiments, the specified displacement is greater than a predetermined threshold, wherein the predetermined threshold is determined by the initial speed $V_s$ and the end speed $V_e$.

In some embodiments, the predetermined threshold is determined by a sum of the end speed $V_e$ and the initial speed $V_s$, and a difference between the end speed $V_e$ and the initial speed $V_s$.

In some embodiments, the maximum value of the time $T_2$ is $$\sqrt{\frac{V_{max} - V_e}{J}},$$

wherein $V_{max}$ represents the maximum speed of the shuttle vehicle, and J represents an acceleration parameter; and in the case that the shuttle vehicle only performs the accelerated motion and the decelerated motion when passing by the specified displacement, a time during which the shuttle vehicle performs the uniform motion is 0, and the time $T_2$ and the time $T_1$ are determined by performing Bisection method on a displacement function of the shuttle vehicle.

In some embodiments, in the case that the end speed $V_e$ is not less than the initial speed $V_s$, the minimum value of the time $T_2$ is 0; and in the case that the end speed $V_e$ is less than the initial speed $V_s$, the minimum value of the time $T_2$ is $$\sqrt{\frac{V_s - V_e}{J}}.$$

In some embodiments, the processor is configured to: determining an first displacement of the shuttle vehicle to perform the accelerated motion by using the time $T_1$ and the initial speed $V_s$, determining a second displacement of the shuttle vehicle to perform the decelerated motion by using the time $T_2$ and the end speed $V_e$; and using a difference value obtained by subtracting the first displacement and the second displacement from the specified displacement as a third displacement of the shuttle vehicle to perform the uniform motion.

According to another aspect of one or more embodiments of the present disclosure, a shuttle vehicle is provided. The shuttle vehicle comprising the apparatus for controlling speed of a shuttle vehicle involved in any of the above embodiments.

According to another aspect of one or more embodiments of the present disclosure, a non-transitory computer readable storage medium is provided, wherein the computer readable storage medium stores a computer instruction, and the instruction implements the method involved in any of the above embodiments when being executed by a processor.

Other features of the present disclosure and advantages thereof will become apparent from the following detailed description of exemplary embodiments of the present disclosure with reference to drawings.

BRIEF DESCRIPTION OF THE DRAWINGS

The accompanying drawings, which constitute a part of the specification, illustrate embodiments of the present disclosure and, together with the description, serve to explain the principles of the present disclosure.

The present disclosure may be understood more clearly from the following detailed description with reference to the accompanying drawings, wherein.

DETAILED DESCRIPTION OF THE EMBODIMENTS

Figure 1:
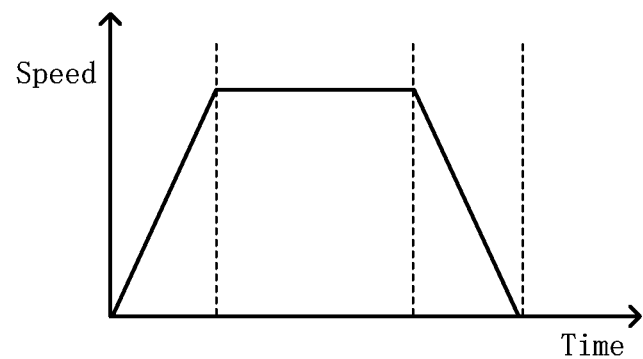
FIG. 1 is an exemplary schematic diagram of a shuttle vehicle speed curve in related art.

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. The following description of at least one exemplary embodiment is merely illustrative and is in no way used as any limitation of the present disclosure or application or use thereof. All of other embodiments, obtained by those of ordinary skill in the art based on the embodiments of the present disclosure without any creative effort, fall into the protection scope of the present disclosure.

Unless otherwise specified, relative arrangement, numerical expressions and numerical values of components and steps set forth in these embodiments do not limit the scope of the present disclosure.

In the meantime, it should be understood that the dimensions of various parts shown in the drawings are not drawn in the actual scale relationship for the convenience of description.

Techniques, methods and devices known to those of ordinary skill in related art may not be discussed in detail, but where appropriate, the techniques, methods and devices should be considered as a part of the authorized specification.

In all of examples shown and discussed herein, any specific value should be construed as illustrative only and is not used as limitation. Accordingly, other examples of the exemplary embodiments may have different values.

It should be noted that similar reference signs and letters indicate similar items in the following drawings, therefore, once a certain item is defined in one drawing, it does not need to be further discussed in the subsequent drawings.

The inventor recognizes that in the related art, a shuttle vehicle adopts a speed curve mode of fixed acceleration and deceleration.

Figure 2:
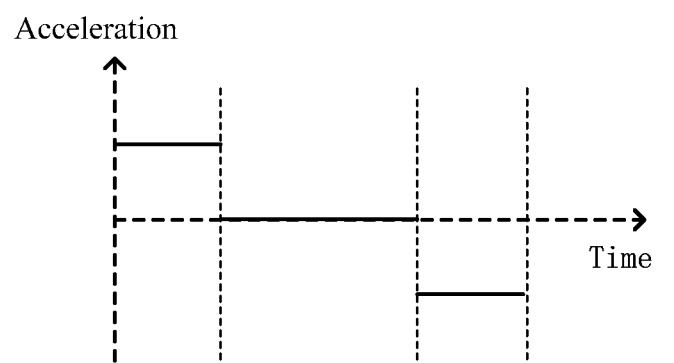
FIG. 2 is an exemplary schematic diagram of a shuttle vehicle acceleration curve in related art.

FIG. 1 is an exemplary schematic diagram of a shuttle vehicle speed curve in related art. FIG. 2 is an exemplary schematic diagram of a shuttle vehicle acceleration curve in related art.

As shown in FIG. 1, a whole displacement is divided into three phases, wherein acceleration is performed at a given acceleration in the first phase up to the maximum speed, uniform motion is performed in the second phase, and deceleration is performed in the third phase until the speed is decelerated to a set end speed.

In the speed curve, when a speed change enters from the acceleration phase to the constant speed phase or enter from the constant speed phase to the deceleration phase, due to the change of the acceleration, as shown in FIG. 2, speed jump will be generated. The speed jump will result in inaccurate positioning.

The inventor of the present disclosure proposes a shuttle vehicle speed control solution that can effectively suppress the speed jump problem. The details are described below in combination with the drawings.

Figure 3:
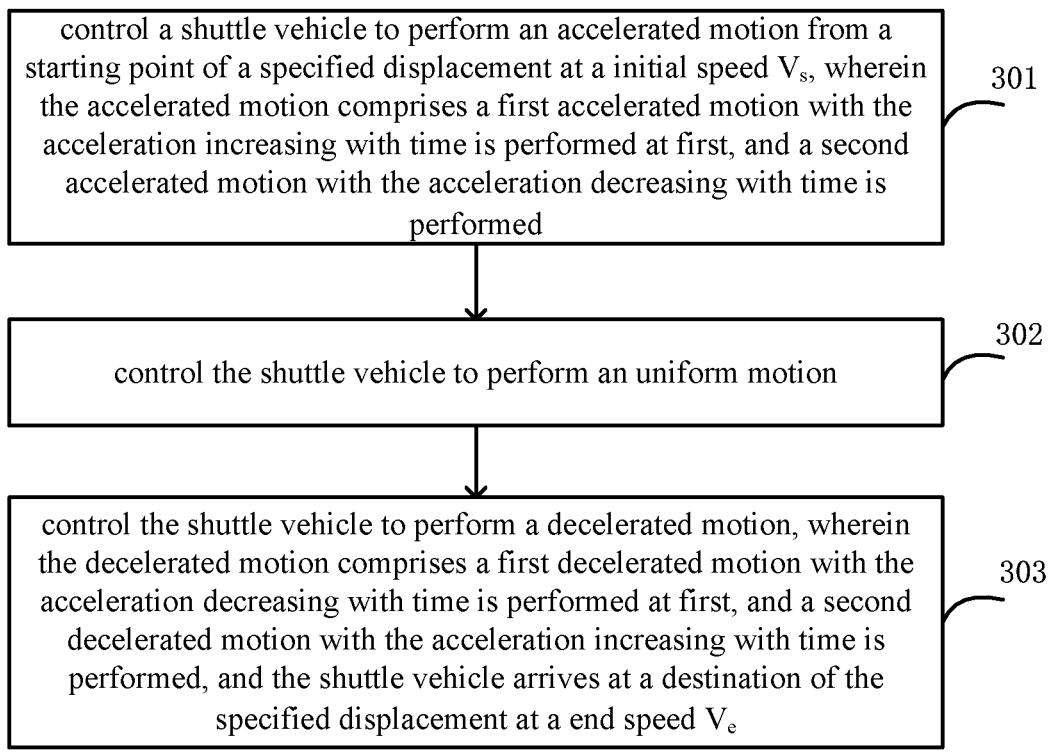
FIG. 3 shows an exemplary flow diagram of a method for controlling speed of a shuttle vehicle according to one embodiment of the present disclosure.

FIG. 3 shows an exemplary flow diagram of a method for controlling speed of a shuttle vehicle according to one embodiment of the present disclosure. The steps of the method of the present embodiment can be executed by a shuttle vehicle speed control apparatus.

In step 301, the shuttle vehicle is controlled, by the control apparatus, to perform an accelerated motion from a starting point of a specified displacement at a initial speed $V_s$, wherein the accelerated motion comprises a first accelerated motion with the acceleration increasing with time is performed at first, and a second accelerated motion with the acceleration decreasing with time is performed.

In some embodiments, a time during which the shuttle vehicle performs the first accelerated motion and a time during which the shuttle vehicle performs the second accelerated motion are a time $T_1$.

In step 302, the shuttle vehicle is controlled, by the control apparatus, to perform an uniform motion.

In step 303, the shuttle vehicle is controlled, by the control apparatus, to perform a decelerated motion, wherein the decelerated motion comprises a first decelerated motion with the acceleration decreasing with time is performed at first, and a second decelerated motion with the acceleration increasing with time is performed, and the shuttle vehicle arrives at a destination of the specified displacement at a end speed $V_e$.

In some embodiments, a time during which the shuttle vehicle performs the first decelerated motion and a time during which the shuttle vehicle performs the second decelerated motion are a time $T_2$.

In some embodiments, a square difference between the time $T_1$ and the time $T_2$ is direct proportional to a difference value between the end speed $V_e$ and the initial speed $V_s$ of the shuttle vehicle. For example, $T_1^2 - T_2^2 = (V_e - V_s)/J$, wherein J represents an acceleration parameter of the shuttle vehicle.

In the method for controlling speed of the shuttle vehicle provided by the above embodiment, by controlling the acceleration and deceleration process in a traveling process of the shuttle vehicle, the speed jump is effectively reduced and the overall efficiency is improved while ensuring the traveling speed.

Figure 4:
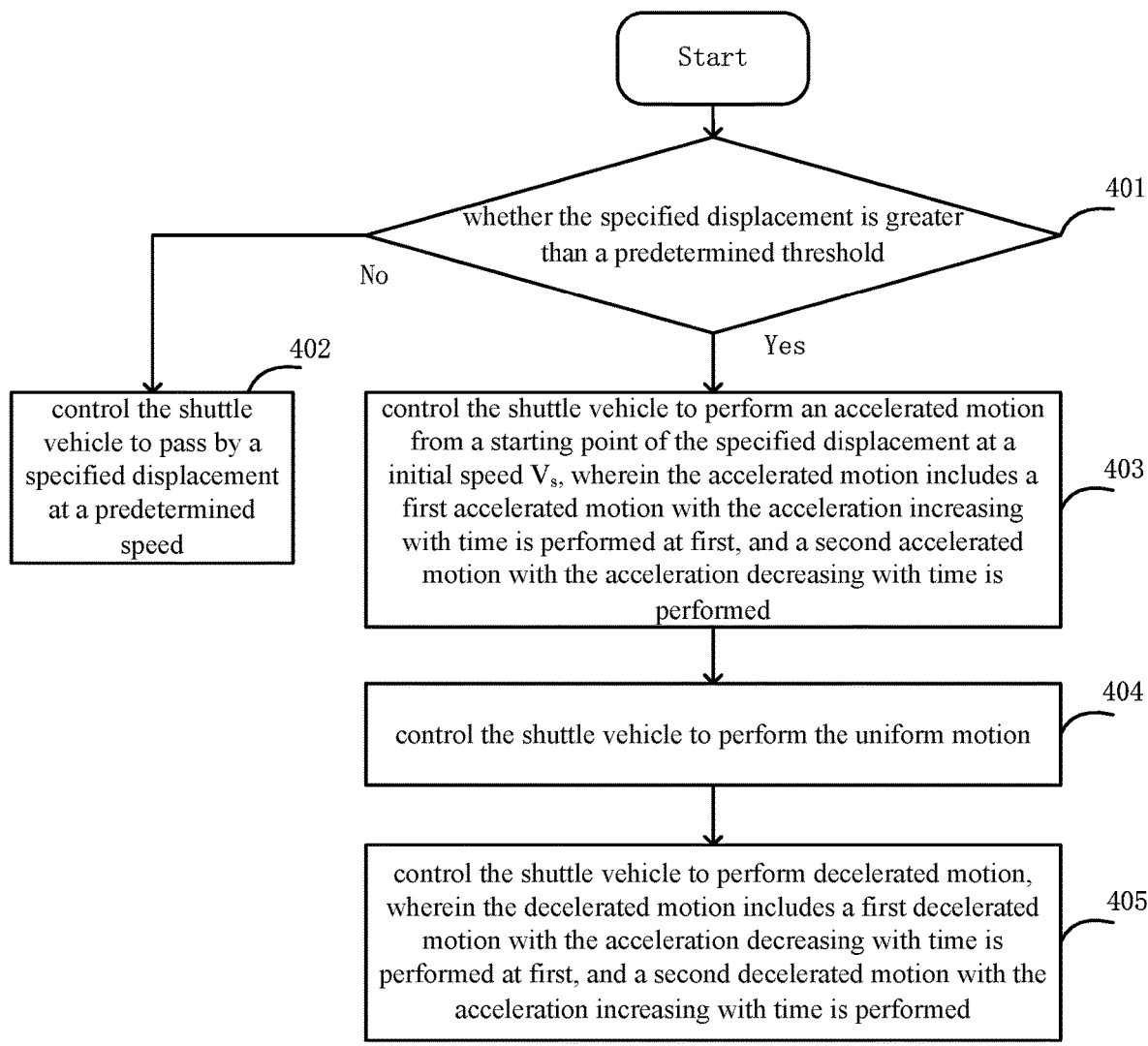
FIG. 4 shows an exemplary flow diagram of a method for controlling speed of a shuttle vehicle according to another embodiment of the present disclosure.

FIG. 4 shows an exemplary flow diagram of a method for controlling speed of a shuttle vehicle according to another embodiment of the present disclosure. The steps of the method of the present embodiment can be executed by a shuttle vehicle speed control apparatus.

In step 401, the specified displacement is judged, by the control apparatus, whether greater than a predetermined threshold, wherein the predetermined threshold is determined by the initial speed $V_s$ and the end speed $V_e$.

If the specified displacement is greater than the predetermined threshold, step 403 is executed; and if the specified displacement is not greater than the predetermined threshold, step 402 is executed.

Since the magnitude relationship between the initial speed $V_s$ and the end speed $V_e$ is different, the corresponding predetermined thresholds are also different.

For example, in the case that the end speed $V_e$ is not less than the initial speed $V_s$, the predetermined threshold is determined by a sum of the end speed $V_e$ and the initial speed $V_s$, and a difference between the end speed $V_e$ and the initial speed $V_s$. In the case that the end speed $V_e$ is less than the initial speed $V_s$, the predetermined threshold is determined by the sum of the end speed $V_e$ and the initial speed $V_s$, and the difference between the initial speed $V_s$ and the end speed $V_e$.

In step 402, the shuttle vehicle is controlled, by the control apparatus, to pass by a specified displacement at a predetermined speed. Other steps of the present embodiment are not executed thereafter.

In step 403, the shuttle vehicle is controlled, by the control apparatus, to perform an accelerated motion from a starting point of the specified displacement at a initial speed $V_s$, wherein the accelerated motion includes a first accelerated motion with the acceleration increasing with time is performed at first, and a second accelerated motion with the acceleration decreasing with time is performed.

In step 404, the shuttle vehicle is controlled, by the control apparatus, to perform an uniform motion.

In step 405, the shuttle vehicle is controlled, by the control apparatus, to perform decelerated motion, wherein the decelerated motion includes a first decelerated motion with the acceleration decreasing with time is performed at first, and a second decelerated motion with the acceleration increasing with time is performed. The shuttle vehicle arrives at a destination of the specified displacement at a end speed $V_e$.

If the specified displacement does not meet the predetermined threshold requirement, it indicates that the specified displacement is too short. In this case, the above speed regulation is not required, and it is only necessary to control the shuttle vehicle to pass by the specified displacement at the predetermined constant speed.

Figure 5:
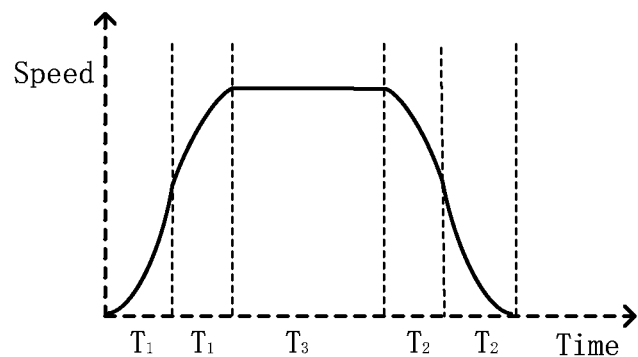
FIG. 5 shows an exemplary schematic diagram of a shuttle vehicle speed curve according to one embodiment of the present disclosure.

FIG. 5 shows an exemplary schematic diagram of a shuttle vehicle speed curve according to one embodiment of the present disclosure.

As shown in FIG. 5, the specified displacement S is divided into three phases, wherein in the first phase (acceleration process displacement $S_{up}$), the shuttle vehicle starts from a starting point of a specified displacement at a initial speed $V_s$ to perform the first accelerated motion with the acceleration increasing with time within a time $T_1$ at first, and then performs the second accelerated motion with the acceleration decreasing with time within the time $T_1$; then in the second phase (uniform process displacement $S_{ev}$), the shuttle vehicle performs the uniform motion within a time $T_3$; and then in the third phase (deceleration process displacement $S_{down}$), the shuttle vehicle performs the first decelerated motion with the acceleration decreasing with time within a time $T_2$, performs second decelerated motion with the acceleration increasing with time within the time $T_2$, and arrives at a destination of the specified displacement at a end speed $V_e$.

A parameter J is set as a change rate of the acceleration, which is a constant value. Then a corresponding acceleration formula is as follows:

$$a(t) = \begin{cases} Jt & t \in [0, T_1) \\ JT_1 - J(t - T_1) & t \in [T_1, 2T_1) \\ 0 & t \in [2T_1, 2T_1 + T_3) \\ -J(t - (2T_1 + T_3)) & t \in [2T_1 + T_3, 2T_1 + T_3 + T_2) \\ -JT_2 + J(t - (2T_1 + T_3 + T_2)) & t \in [2T_1 + T_3 + T_2, 2T_1 + T_3 + 2T_2] \end{cases} \quad (1)$$

Figure 6:
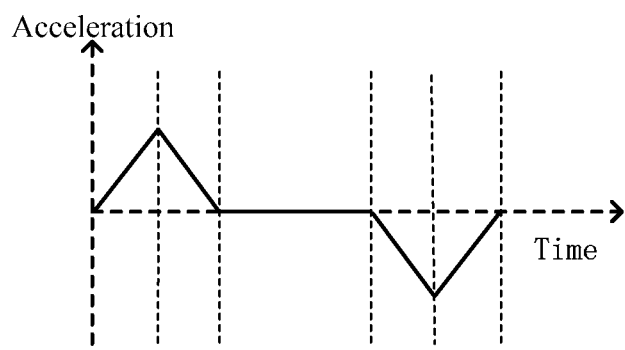
FIG. 6 shows an exemplary schematic diagram of a shuttle vehicle acceleration curve according to another embodiment of the present disclosure.

FIG. 6 shows an exemplary schematic diagram of a shuttle vehicle acceleration curve according to one embodiment of the present disclosure.

As shown in FIG. 6, the corresponding acceleration formula is as follows:

$$V(t) = \begin{cases} V_S + \frac{1}{2}Jt^2 & t \in [0, T_1) \\ V_S + JT_1^2 - \frac{1}{2}J(t - 2T_1)^2 & t \in [T_1, 2T_1) \\ V_S + JT_1^2 & t \in [2T_1, 2T_1 + T_3) \\ V_S + JT_1^2 - \frac{1}{2}J(t - (2T_1 + T_3))^2 & t \in \begin{bmatrix} 2T_1 + T_3, \\ 2T_1 + T_3 + T_2 \end{bmatrix} \\ V_S + J(T_1^2 - T_2^2) + \frac{1}{2}J(t - (2T_1 + T_3 + 2T_2))^2 & t \in \begin{bmatrix} 2T_1 + T_3 + T_2, \\ 2T_1 + T_3 + 2T_2 \end{bmatrix} \end{cases} \quad (2)$$

A corresponding displacement formula is as follows:

$$S(t) = \begin{cases} V_S t + \frac{1}{6}Jt^3 & t \in [0, T_1) \\ (V_S + JT_1^2) \cdot t - \frac{1}{6}J(t - 2T_1)^3 - JT_1^3 & t \in [T_1, 2T_1) \\ (V_S + JT_1^2) \cdot t - JT_1^3 & t \in [2T_1, 2T_1 + T_3) \\ (V_S + JT_1^2) \cdot t - \frac{1}{6}J(t - (2T_1 + T_3))^3 - JT_1^3 & t \in \begin{bmatrix} 2T_1 + T_3, \\ 2T_1 + T_3 + T_2 \end{bmatrix} \\ (V_S + J(T_1^2 - T_2^2)) \cdot t + \\ \frac{1}{6}J(t - (2T_1 + T_3 + 2T_2))^3 + \\ JT_2^2(2T_1 + T_3 + T_2) - JT_1^3 & t \in \begin{bmatrix} 2T_1 + T_3 + T_2, \\ 2T_1 + T_3 + 2T_2 \end{bmatrix} \end{cases} \quad (3)$$

Since the initial speed $V_s$, the end speed $V_e$, the specified displacement S and the change rate J of the acceleration are all known, if the $T_1$, $T_2$, and $T_3$ can be obtained, then the displacement curve is solved accordingly.

If $t=2T_1+2T_2+T_3$, it can be obtained from the formula (2) that:

$$V_e = V_s + J(T_1^2 - T_2^2) \quad (4)$$

If the uniform process displacement $S_{ev} \geq 0$, then the maximum speed $V_{max}$ of the shuttle vehicle is a uniform speed, and it can be obtained from the formula (2) that:

$$V_{max} = V_s + JT_1^2 \quad (5)$$

It can be obtained by substituting the formula (5) into the formula (4) that:

$$V_{max} = V_e + JT_2^2 \quad (6)$$

Then, it can be deduced from the formula (3) that:

$$\begin{cases} S_{up} = 2V_s T_1 + JT_1^3 \\ S_{ev} = (V_s + JT_1^2) \cdot T_3 \\ S_{down} = 2V_e T_2 + JT_2^3 \end{cases} \quad (7)$$

If $S_{ev}<0$, there is no uniform area. That is, $T_3$ is 0, and the speed cannot reach $V_{max}$, and it can be obtained from the formula (3) and the formula (4) that:

$$S(t)|_{t=2T_1+2T_2+T_3} = 2V_e T_2 + JT_2^3 + (V_e + V_s + JT_2^2)\sqrt{\frac{V_e - V_s}{J} + T_2^2} \quad (8)$$

If $T_2$ in the above form is deemed as a variable, then it can be used as a function about $T_2$ then:

$$\tilde{S}(T_2) = 2V_e T_2 + JT_2^3 + (V_e + V_s + JT_2^2)\sqrt{\frac{V_e - V_s}{J} + T_2^2} \quad (9)$$

$\tilde{S}(T_2)$ is monotonically increasing relative to an interval $T_2 \in [0, +\infty)$. An upper limit of the value of $T_2$ obtained according to the formula (6) is $$\sqrt{\frac{V_{max} - V_e}{J}}.$$

If $V_e \geq V_s$, the minimum value of $T_2$ is 0, and then the value range is $$\left[0, \sqrt{\frac{V_{max} - V_e}{J}}\right]$$

Therefore, if the displacement is set as follows:

$$S > (V_e + V_s)\sqrt{\frac{V_e - V_s}{J}} \quad (10)$$

Then, $T_2$ has a positive solution, $\tilde{S}(T_2)=S$ is set in the formula (9), then $T_2$ can be solved by using the Bisection method. The bisection method in mathematics is a root-finding method that repeatedly bisects an interval and then selects a subinterval in which a root must lie for further processing. The method is also called the interval halving method, the binary search method, or the dichotomy method.

If $V_e < V_s$, it can be obtained from the formula (4) that:

$$\frac{V_e - V_s}{J} + T_2^2 \geq 0 \qquad (11)$$

That is, the minimum value of $T_2$ is $$\sqrt{\frac{V_s - V_e}{J}},$$

then the value range of $T_2$ is $$\left[\sqrt{\frac{V_s - V_e}{J}}, \sqrt{\frac{V_{max} - V_e}{J}}\right].$$

Therefore, if the displacement is set as follows:

$$S > (V_e + V_s)\sqrt{\frac{V_s - V_e}{J}} \qquad (12)$$

Then, $T_2$ has a positive solution, $\tilde{S}(T_2)=S$ is set in the formula (9), then $T_2$ can be solved by using the Bisection method.

The obtained $T_2$ is substituted into the formula (4) to obtain $T_1$, then $S_{up}$, $S_{down}$, $S_{ev}$ and $T_3$ can be obtained by using the formula (7), and the speed of each area can be obtained by substituting $T_1$, $T_2$ and $T_3$ into the formula (2).

That is to say, an acceleration process displacement (a first displacement) of the shuttle vehicle to perform the accelerated motion is determined by using the time $T_1$ and the initial speed $V_s$, a deceleration process displacement (a second displacement) of the shuttle vehicle to perform the decelerated motion is determined by using the time $T_2$ and the end speed $V_e$, and a difference value obtained by subtracting the acceleration process displacement and the deceleration process displacement from the specified displacement is used as a uniform process displacement (a third displacement) of the shuttle vehicle to perform the uniform motion. The time $T_3$ during which the shuttle vehicle performs the uniform motion is determine by using the uniform process displacement, the time $T_1$ and the initial speed $V_s$. The running speed of the shuttle vehicle at each moment is determined by using the initial speed $V_s$, the acceleration parameter J, and the times $T_1$, $T_2$, and $T_3$.

Figure 7:
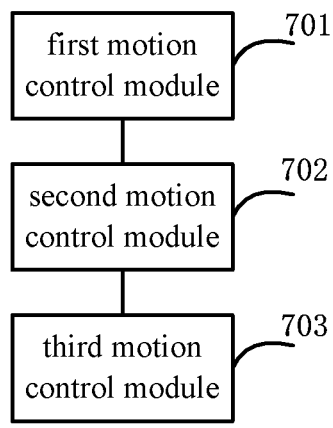
FIG. 7 shows an exemplary block diagram of a shuttle vehicle speed control apparatus according to one embodiment of the present disclosure.

FIG. 7 shows an exemplary block diagram of an apparatus for controlling speed of a shuttle vehicle according to one embodiment of the present disclosure.

As shown in FIG. 7, the apparatus comprises a first motion control module 701, a second motion control module 702 and a third motion control module 703.

The first motion control module 701 is configured to control a shuttle vehicle to perform an accelerated motion from a starting point of a specified displacement at a initial speed $V_s$, wherein the accelerated motion includes a first accelerated motion with the acceleration increasing with time is performed at first, and a second accelerated motion with the acceleration decreasing with time is performed.

In some embodiments, a time during which the shuttle vehicle performs the first accelerated motion and a time during which the shuttle vehicle performs the second accelerated motion are a time $T_1$.

The second motion control module 702 is configured to control the shuttle vehicle to perform an uniform motion.

The third motion control module 703 is configured to control the shuttle vehicle to perform an decelerated motion, wherein the decelerated motion includes a first decelerated motion with the acceleration decreasing with time is performed at first, and a second decelerated motion with the acceleration increasing with time is performed, and the shuttle vehicle arrives at a destination of the specified displacement at a end speed $V_e$.

In some embodiments, a time during which the shuttle vehicle performs the first decelerated motion and a time during which the shuttle vehicle performs the second decelerated motion are a time $T_2$.

In some embodiments, a square difference between $T_1$ and $T_2$ is direct proportional to a difference value between the end speed $V_e$ and the initial speed $V_s$ of the shuttle vehicle.

In the apparatus for controlling speed of the shuttle vehicle provided by the above embodiment, by controlling the acceleration and deceleration process in a traveling process of the shuttle vehicle, the speed jump is effectively reduced and the overall efficiency is improved while ensuring the traveling speed.

Figure 8:
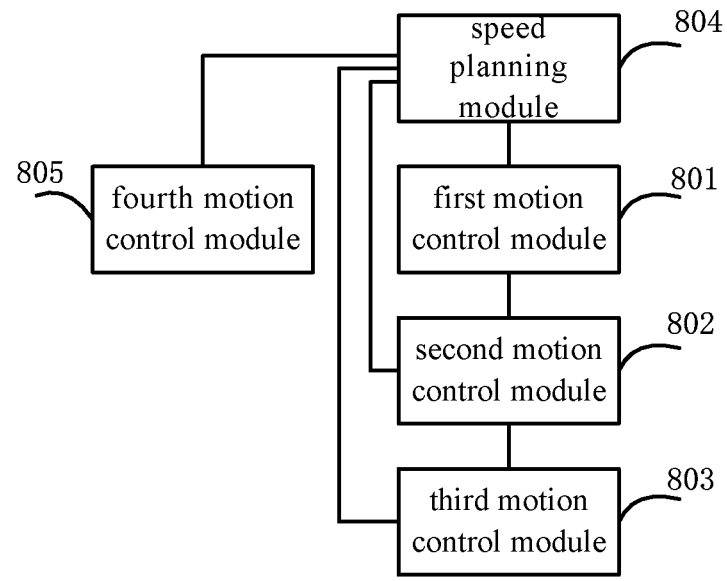
FIG. 8 shows an exemplary block diagram of a apparatus for controlling speed of a shuttle vehicle according to another embodiment of the present disclosure.

FIG. 8 shows an exemplary block diagram of an apparatus for controlling speed of a shuttle vehicle according to another embodiment of the present disclosure.

As shown in FIG. 8, the apparatus further includes a speed planning module 804 and a fourth motion control module 805 in addition to the first motion control module 801, the second motion control module 802 and the third motion control module 803.

The speed planning module 804 is configured to judge whether the specified displacement of the shuttle vehicle is greater than a predetermined threshold, wherein the predetermined threshold is determined by the initial speed $V_s$ and the end speed $V_e$. If the specified displacement of the shuttle vehicle is greater than the predetermined threshold, the speed planning module 804 indicates the first motion control module 801 to execute the operation of controlling the shuttle vehicle to perform the accelerated motion from the starting point of the specified displacement at the initial speed $V_s$.

The fourth motion control module 805 is configured to control the shuttle vehicle to pass by the specified displacement at the predetermined speed according to the judgment result of the speed planning module 804 in the case that the specified displacement is not greater than the predetermined threshold.

In some embodiments, when the end speed $V_e$ is not less than the initial speed $V_s$, the predetermined threshold is determined by a sum of the end speed $V_e$ and the initial speed $V_s$, and a difference between the end speed $V_e$ and the initial speed $V_s$. When the end speed $V_e$ is less than the initial speed $V_s$, the predetermined threshold is determined by the sum of the end speed $V_e$ and the initial speed $V_s$, and the difference between the initial speed $V_s$ and the end speed $V_e$.

In some embodiments, the speed planning module 804 is further configured to determine time, speed, displacement and other information of the shuttle vehicle at each interval, and provide corresponding parameter for the corresponding motion control modules to perform corresponding control on the shuttle vehicle.

For example, when the end speed $V_e$ is not less than the initial speed $V_s$, the speed planning module 804 specifically determine a value range of the time $T_2$ as $$\left[ 0, \sqrt{\frac{V_{max} - V_e}{J}} \right],$$

$V_{max}$ represents the maximum speed of the shuttle vehicle, and J represents an acceleration parameter. It is set that the shuttle vehicle only performs the accelerated motion and the decelerated motion when passing by the specified displacement, and the times $T_2$ and $T_1$ are determined through a displacement function of the shuttle vehicle by using the Bisection method in accordance with the above formula (9).

When the end speed $V_e$ is less than the initial speed $V_s$, the speed planning module 804 specifically determine the value range of the time $T_2$ as $$\left[ \sqrt{\frac{V_s - V_e}{J}}, \sqrt{\frac{V_{max} - V_e}{J}} \right],$$

$V_{max}$ represents the maximum speed of the shuttle vehicle, and J represents the acceleration parameter; and it is set that the shuttle vehicle only performs the accelerated motion and the decelerated motion when passing by the specified displacement, and the times $T_2$ and $T_1$ are determined through a displacement function of the shuttle vehicle by using the Bisection method in accordance with the above formula (9).

In some embodiments, the speed planning module 804 is further configured to determine an acceleration process displacement of the shuttle vehicle to perform the accelerated motion by using the time $T_1$ and the initial speed $V_s$. The speed planning module 804 is further configured to determine a deceleration process displacement of the shuttle vehicle to perform the decelerated motion by using the time $T_2$ and the end speed $V_e$. The speed planning module 804 is further configured to use a difference value obtained by subtracting the acceleration process displacement and the deceleration process displacement from the specified displacement as a uniform process displacement of the shuttle vehicle to perform the uniform motion.

In some embodiments, the speed planning module 804 is further configured to determine the time $T_3$ during which the shuttle vehicle performs the uniform motion by using the uniform process displacement, the time $T_1$ and the initial speed $V_s$.

For example, related calculation can be completed through the above formula (7).

Thereafter, the speed planning module 804 can also determine the running speed of the shuttle vehicle at each moment by using the initial speed $V_s$, the acceleration parameter J, and the times $T_1$, $T_2$, and $T_3$ using the above formula (2).

Figure 9:
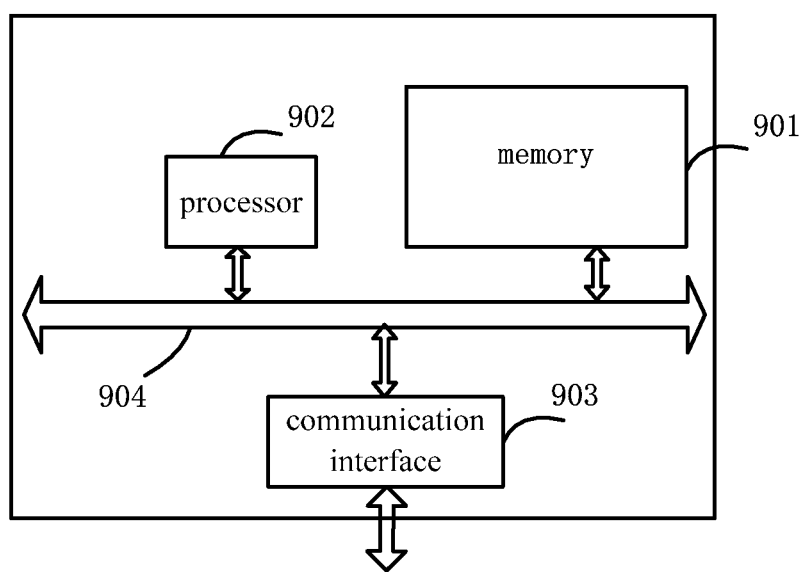
FIG. 9 shows an exemplary block diagram of a apparatus for controlling speed of a shuttle vehicle according to still another other embodiment of the present disclosure.

FIG. 9 shows an exemplary block diagram of a shuttle vehicle speed control apparatus according to another embodiment of the present disclosure.

As shown in FIG. 9, an apparatus for controlling speed of the shuttle vehicle can include a memory 901 and a processor 902. The memory 901 is configured to store instructions, the processor 902 is coupled to the memory 901. The processor 902 is configured to execute the method involved in any of the above embodiments in FIG. 3 or FIG. 4 based on the instructions stored in the memory.

As shown in FIG. 9, the apparatus for controlling speed of the shuttle vehicle further includes a communication interface 903, which is configured to perform information interaction with other devices. At the same time, the apparatus further includes a bus 904, the processor 902, the communication interface 903 and the memory 901 communication with each other through a bus 904.

The memory 901 can include a high-speed RAM memory and can also include a non-volatile memory, for example, at least one magnetic disk memory. The memory 901 can also be a memory array. The memory 901 can also be partitioned, and the blocks can be combined into a virtual volume according to certain rules.

In addition, the processor 902 can be a central processing unit CPU, or can be an application specific integrated circuit (ASIC), or is configured to implement one or more integrated circuits in the embodiments of the present disclosure.

Figure 10:
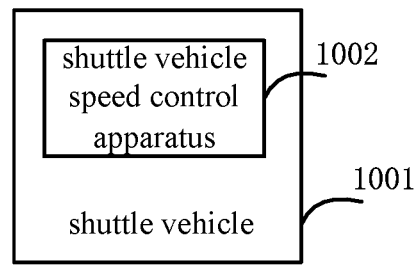
FIG. 10 shows an exemplary block diagram of a shuttle vehicle according to one embodiment of the present disclosure.

FIG. 10 shows an exemplary block diagram of a shuttle vehicle according to one embodiment of the present disclosure.

As shown in FIG. 10, a shuttle vehicle 1001 includes a shuttle vehicle speed control apparatus 1002, wherein the shuttle vehicle speed control apparatus 1002 can be the apparatus for controlling speed of the shuttle vehicle involved in any of the embodiments in FIG. 7 to FIG. 9.

In some embodiments, the functional unit module described in the above embodiments can be implemented as a general purpose processor, a programmable logic controller (PLC), a digital signal processor (DSP), an application specific integrated circuit (ASIC), a field-programmable gate array (FPGA) or other programmable logic devices, discrete gates or transistors logic devices, discrete hardware components, or any suitable combination thereof.

The present disclosure further provides a computer readable storage medium, wherein the computer readable storage medium stores computer instructions, and the instructions implement the method involved in any of the embodiments in FIG. 3 or FIG. 4 when being executed by a processor. Those skilled in the art should understand that the embodiments of the present disclosure can be provided as methods, apparatuses or computer program products. Accordingly, the present disclosure can take the form of an entirely hardware embodiment, an entirely software embodiment, or an embodiment combining software and hardware aspects. Moreover, the present disclosure can take the form of a computer program product embodied on one or more computer-usable non-transitory storage media (including, but not limited to, a disk memory, a CD-ROM, an optical memory or the like) containing computer usable program codes.

By implementing the present disclosure, the acceleration and deceleration process of a traveling path can be controlled by using the acceleration and deceleration control technology under the condition of ensuring the accuracy, thereby improving the travelling speed, reducing the speed jump and improving the overall efficiency.

Those skilled in the art should understand that the embodiments of the present disclosure can be provided as a methods, systems or computer program products. Accordingly, the present disclosure can take the form of an entirely hardware embodiment, an entirely software embodiment, or an embodiment combining software and hardware aspects. Moreover, the present disclosure can take the form of a computer program product embodied on one or more computer-usable non-transitory storage media (including, but not limited to, a disk memory, a CD-ROM, an optical memory or the like) containing computer usable program codes.

The present disclosure is described with reference to the flow diagrams and/or block diagrams of the methods, devices (systems) and the computer program products in the embodiments of the present disclosure. It should be understood that computer program instructions can achieve each flow and/or block in the flow diagrams and/or block diagrams and the combination of the flows and/or blocks in the flow diagrams and/or block diagrams. These computer program instructions can be provided to a general-purpose computer, a special-purpose computer, an embedded processor or processors of other programmable data processing devices to generate a machine, such that the instructions executed by computers or the processors of other programmable data processing devices generate apparatuses used for achieving specified functions in one or more flows of the flow diagrams and/or one or more blocks in the block diagrams.

These computer program instructions can also be loaded onto computer readable memories that are capable of guiding the computers or the other programmable data processing devices to work in a specific manner, so that the instructions stored in the computer readable memories generate a product including an instruction apparatus, and the instruction apparatus implements specified functions in one or more flows of the flow diagrams and/or one or more blocks in the block diagrams.

These computer program instructions can also be loaded onto the computers or the other programmable data processing devices, so that a series of operation steps are executed on the computers or the other programmable devices to generate the processing implemented by the computers, therefore the instructions executed on the computers or the other programmable devices provide steps for implementing the specified functions in one or more flows of the flow diagrams and/or one or more blocks in the block diagrams.

The description of the present disclosure is presented for the purpose of illustration and description, rather than achieving non-leakage or limiting the present disclosure to the disclosed form. Many modifications and variations are apparent to those skilled in the art. The embodiments are chosen and described to better explain the principles and the actual applications of the present disclosure, and various embodiments with various modifications suitable for special uses are designed, so that those of ordinary skill in the art can understand the present disclosure.

What is claimed is:

1. A method for controlling speed of a shuttle vehicle, comprising:
controlling the shuttle vehicle to perform an accelerated motion from a starting point of a specified displacement at an initial speed $V_s$, wherein the accelerated motion comprises a first accelerated motion with the acceleration increasing with time is performed at first, and a second accelerated motion with the acceleration decreasing with time is performed;
controlling the shuttle vehicle to perform a uniform motion; and
controlling the shuttle vehicle to perform a decelerated motion, wherein the decelerated motion comprises a first decelerated motion with the acceleration decreasing with time is performed at first, and a second decelerated motion with the acceleration increasing with time is performed, and the shuttle vehicle arrives at a destination of the specified displacement at an end speed $V_e$.

2. The method according to claim 1, wherein,
a time during which the shuttle vehicle performs the first accelerated motion and a time during which the shuttle vehicle performs the second accelerated motion are a time $T_1$; and
a time during which the shuttle vehicle performs the first decelerated motion and a time during which the shuttle vehicle performs the second decelerated motion are a time $T_2$.

3. The method according to claim 2, wherein,
a square difference between the time $T_1$ and the time $T_2$ is direct proportional to a difference value between the end speed $V_e$ and the initial speed $V_s$ of the shuttle vehicle.

4. The method according to claim 1, wherein,
the specified displacement is greater than a predetermined threshold, wherein the predetermined threshold is determined by the initial speed $V_s$ and the end speed $V_e$.

5. The method according to claim 4, wherein,
the predetermined threshold is determined by a sum of the end speed $V_e$ and the initial speed $V_s$, and a difference between the end speed $V_e$ and the initial speed $V_s$.

6. The method according to claim 5, wherein,
the maximum value of the time $T_2$ is $$\sqrt{\frac{V_{max} - V_c}{J}},$$

wherein $V_{max}$ represents the maximum speed of the shuttle vehicle, and J represents an acceleration parameter; and
in the case that the shuttle vehicle only performs the accelerated motion and the decelerated motion when passing by the specified displacement, a time during which the shuttle vehicle performs the uniform motion is 0, and the time $T_2$ and the time $T_1$ are determined by performing Bisection method on a displacement function of the shuttle vehicle.

7. The method according to claim 6, wherein,
in the case that the end speed $V_e$ is not less than the initial speed $V_s$, the minimum value of the time $T_2$ is 0; and
in the case that the end speed $V_e$ is less than the initial speed $V_s$, the minimum value of the time $T_2$ is $$\sqrt{\frac{V_s - V_e}{J}}.$$

8. The method according to claim 6, further comprising:
determining a first displacement of the shuttle vehicle to perform the accelerated motion by using the time $T_1$ and the initial speed Vs;
determining a second displacement of the shuttle vehicle to perform the decelerated motion by using the time $T_2$ and the end speed $V_e$; and
using a difference value obtained by subtracting the first displacement and the second displacement from the specified displacement as a third displacement of the shuttle vehicle to perform the uniform motion.

9. The method according to claim 8, further comprising:
determining a time $T_3$ during which the shuttle vehicle performs the uniform motion by using the third displacement, the time $T_1$ and the initial speed $V_s$.

10. The method according to claim 9, further comprising:
determining a running speed of the shuttle vehicle at each moment by using the initial speed $V_s$, the acceleration parameter J, the time $T_1$, the time $T_2$, and the time $T_3$.

11. An apparatus for controlling speed of a shuttle vehicle, comprising:
a memory, configured to store instructions; and
a processor, coupled to the memory, and based on the instructions stored in the memory, the processor is configured to:
control the shuttle vehicle to perform an accelerated motion from a starting point of a specified displacement at an initial speed $V_s$, wherein the accelerated motion comprises a first accelerated motion with the acceleration increasing with time is performed at first, and a second accelerated motion with the acceleration decreasing with time is performed;
control the shuttle vehicle to perform a uniform motion; and
control the shuttle vehicle to perform a decelerated motion, wherein the decelerated motion comprises a first decelerated motion with the acceleration decreasing with time is performed at first, and a second decelerated motion with the acceleration increasing with time is performed, and the shuttle vehicle arrives at a destination of the specified displacement at an end speed $V_e$.

12. The apparatus according to claim 11, wherein,
a time during which the shuttle vehicle performs the first accelerated motion and a time during which the shuttle vehicle performs the second accelerated motion are a time $T_1$; and
a time during which the shuttle vehicle performs the first decelerated motion and a time during which the shuttle vehicle performs the second decelerated motion are a time $T_2$.

13. The apparatus according to claim 12, wherein,
a square difference between the time $T_1$ and the time $T_2$ is direct proportional to a difference value between the end speed $V_e$ and the initial speed $V_s$ of the shuttle vehicle.

14. The apparatus according to claim 11, wherein,
the specified displacement is greater than a predetermined threshold, wherein the predetermined threshold is determined by the initial speed $V_s$ and the end speed $V_e$.

15. The apparatus according to claim 14, wherein,
the predetermined threshold is determined by a sum of the end speed $V_e$ and the initial speed $V_s$, and a difference between the end speed $V_e$ and the initial speed $V_s$.

16. The apparatus according to claim 15, wherein,
the maximum value of the time $T_2$ is $$\sqrt{\frac{V_{max} - V_e}{J}},$$

wherein $V_{max}$ represents the maximum speed of the shuttle vehicle, and J represents an acceleration parameter; and
in the case that the shuttle vehicle only performs the accelerated motion and the decelerated motion when passing by the specified displacement, a time during which the shuttle vehicle performs the uniform motion is 0, and the time $T_2$ and the time $T_1$ are determined by performing Bisection method on a displacement function of the shuttle vehicle.

17. The apparatus according to claim 16, wherein,
in the case that the end speed $V_e$ is not less than the initial speed $V_s$, the minimum value of the time $T_2$ is 0; and
in the case that the end speed $V_e$ is less than the initial speed $V_s$, the minimum value of the time $T_2$ is $$\sqrt{\frac{V_s - V_e}{J}}.$$

18. The apparatus according to claim 16, the processor is further configured to:
determine a first displacement of the shuttle vehicle to perform the accelerated motion by using the time $T_1$ and the initial speed $V_s$;
determine a second displacement of the shuttle vehicle to perform the decelerated motion by using the time $T_2$ and the end speed $V_e$; and
use a difference value obtained by subtracting the first displacement and the second displacement from the specified displacement as a third displacement of the shuttle vehicle to perform the uniform motion.

19. A shuttle vehicle, comprising:
an apparatus for controlling speed, comprising:
a memory, configured to store instructions; and
a processor, coupled to the memory, and based on the instructions stored in the memory, the processor is configured to:
control the shuttle vehicle to perform an accelerated motion from a starting point of a specified displacement at an initial speed Vs, wherein the accelerated motion comprises a first accelerated motion with the acceleration increasing with time is performed at first, and a second accelerated motion with the acceleration decreasing with time is performed;
control the shuttle vehicle to perform a uniform motion; and
control the shuttle vehicle to perform a decelerated motion, wherein the decelerated motion comprises a first decelerated motion with the acceleration decreasing with time is performed at first, and a second decelerated motion with the acceleration increasing with time is performed, and the shuttle vehicle arrives at a destination of the specified displacement at an end speed Ve.

* * * * *